United States Patent
Ishii (10) Patent No.: US 9,171,222 B2
(45) Date of Patent: Oct. 27, 2015

(54) IMAGE PROCESSING DEVICE, IMAGE CAPTURING DEVICE, AND IMAGE PROCESSING METHOD FOR TRACKING A SUBJECT IN IMAGES

(71) Applicant: Panasonic Intellectual Property Corporation of America, Torrance, CA (US)

(72) Inventor: Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 59 days.

(21) Appl. No.: 13/979,175

(22) PCT Filed: Nov. 13, 2012

(86) PCT No.: PCT/JP2012/007271
§ 371 (c)(1),
(2) Date: Jul. 11, 2013

(87) PCT Pub. No.: WO2013/073168
PCT Pub. Date: May 23, 2013

(65) Prior Publication Data
US 2013/0287259 A1 Oct. 31, 2013

(30) Foreign Application Priority Data
Nov. 17, 2011 (JP) ................................. 2011-251943

(51) Int. Cl.
*G06K 9/00* (2006.01)
*G06K 9/32* (2006.01)
(Continued)

(52) U.S. Cl.
CPC ............ *G06K 9/3241* (2013.01); *G06T 7/0081* (2013.01); *G06T 7/204* (2013.01); *H04N 5/232* (2013.01); *G06T 2207/20148* (2013.01)

(58) Field of Classification Search
None
See application file for complete search history.

(56) References Cited

U.S. PATENT DOCUMENTS 6,917,692 B1 * 7/2005 Murching et al. ............ 382/103
8,089,548 B2    1/2012 Ogura et al.
(Continued)

FOREIGN PATENT DOCUMENTS

| JP | 08-167028 | 6/1996 |
|---|---|---|
| JP | 2009-141475 | 6/2009 |

(Continued)

OTHER PUBLICATIONS

B. Heisele et al. "Tracking non-rigid, moving objects based on color cluster flow", IEEE 1997, pp. 257-260.*
(Continued)

*Primary Examiner* — Barry Drennan
*Assistant Examiner* — Samah Beg
(74) *Attorney, Agent, or Firm* — Wenderoth, Lind & Ponack, L.L.P.

(57) ABSTRACT

An image processing device for tracking a subject included in a first image, in a second image captured after the first image includes: a segmentation unit that divides the first image into a plurality of segments based on similarity in pixel values; an indication unit that indicates a position of the subject in the first image; a region setting unit that sets, as a target region, a region including at least an indicated segment which is a segment at the indicated position; an extraction unit that extracts a feature amount from the target region; and a tracking unit that tracks the subject by searching the second image for a region similar to the target region using the extracted feature amount.

8 Claims, 10 Drawing Sheets

(51) Int. Cl.
*H04N 5/232* (2006.01)
*G06T 7/00* (2006.01)
*G06T 7/20* (2006.01)

(56) References Cited

U.S. PATENT DOCUMENTS

| | | |
|---|---|---|
| 8,253,819 B2 * | 8/2012 | Ishii et al. .................. 348/222.1 |
| 2001/0048753 A1 * | 12/2001 | Lee et al. ....................... 382/103 |
| 2002/0122042 A1 * | 9/2002 | Bates et al. .................... 345/581 |
| 2005/0228849 A1 * | 10/2005 | Zhang ............................ 709/200 |
| 2007/0003691 A1 * | 1/2007 | Rodrigues et al. ............. 427/140 |
| 2008/0204569 A1 * | 8/2008 | Miller et al. ................ 348/222.1 |
| 2008/0205773 A1 * | 8/2008 | Ma et al. ....................... 382/225 |
| 2009/0010549 A1 | 1/2009 | Muramatsu |
| 2009/0087088 A1 * | 4/2009 | Chen et al. .................... 382/165 |
| 2010/0177234 A1 | 7/2010 | Ogura et al. |
| 2010/0214407 A1 | 8/2010 | Abe |
| 2010/0329550 A1 * | 12/2010 | Cheatle ......................... 382/165 |
| 2011/0110597 A1 * | 5/2011 | Abe et al. ...................... 382/199 |
| 2011/0150280 A1 | 6/2011 | Tsuji |
| 2013/0155287 A1 | 6/2013 | Muramatsu |
| 2014/0294301 A1 * | 10/2014 | Nagaoka ....................... 382/173 |

FOREIGN PATENT DOCUMENTS

| | | |
|---|---|---|
| JP | 2009-157821 | 7/2009 |
| JP | 2010-067252 | 3/2010 |
| JP | 2011-134117 | 7/2011 |
| WO | 2009/125596 | 10/2009 |

OTHER PUBLICATIONS

International Search Report issued Feb. 5, 2013 in International (PCT) Application No. PCT/JP2012/007271.
European Search Report issued Feb. 11, 2015 in corresponding European Application No. 12849347.5.

\* cited by examiner

(a) Before clustering (initial cluster)

(b) After clustering

Indicated position

(b)

Indicated position
Region of interest

FIG. 10

(a) First image (b) Second image

FIG. 11

Centroid

FIG. 12

IMAGE PROCESSING DEVICE, IMAGE CAPTURING DEVICE, AND IMAGE PROCESSING METHOD FOR TRACKING A SUBJECT IN IMAGES

TECHNICAL FIELD

The present invention relates to an image processing device, an image capturing device, and an image processing method for tracking a subject included in a first image, in a second image captured after the first image.

BACKGROUND OF INVENTION

Background Art

Cameras (such as digital still cameras or digital video cameras) including touch panels that display images in real time are in widespread use. Users can capture photographs or video while checking images displayed on a touch panel. Moreover, the users can indicate the position of a subject of interest in an image displayed on the touch panel by touching the touch panel.

When the position of the subject of interest is indicated, a camera performs operations such as autofocus (AF) or automatic exposure (AE) using a feature amount extracted from a region around the position. As a result, the camera can capture a photograph or video suitable for the subject of user's interest.

Here, for example, when the subject or the camera moves after the AF operation, the subject in focus is brought into out of focus. Here, a technique for automatically tracking the subject in the image displayed on the touch panel has been suggested (e.g., Patent Literature 1).

The camera performs the AF operation again using the feature amount extracted from the region of the subject tracked in such a manner so that it can automatically focus on the subject even if the subject or the camera moves.

CITATION LIST

Patent Literature

[PTL 1] WO2009/125596

SUMMARY OF INVENTION

However, in the conventional method described above, a region from which a feature amount is extracted has a predetermined shape (such as rectangle and ellipse). Therefore, when a subject has a shape different from the predetermined shape, a camera cannot properly extract the feature amount of the subject. As a result, it is difficult for the camera to accurately track the subject.

Here, the present invention provides an image processing device, an image capturing device, and an image processing method capable of accurately tracking a subject included in a first image, in a second image captured after the first image.

An image processing device according to an aspect of the present invention is an image processing device for tracking a subject included in a first image, in a second image captured after the first image. The image processing device includes: a segmentation unit that divides the first image into a plurality of segments based on similarity in pixel values; an indication unit that indicates a position of the subject in the first image; a region setting unit that sets, as a target region, a segment group including an indicated segment which is a segment at the indicated position; an extraction unit that extracts a feature amount from the target region; and a tracking unit that tracks the subject by searching the second image for a region similar to the target region using the extracted feature amount.

It should be noted that a general or specific aspect of these may be achieved by a system, a method, an integrated circuit, a computer program, or a computer-readable recording medium such as CD-ROM, or may be achieved by any combinations of systems, methods, integrated circuits, computer programs, and recording media.

With an image processing device according to an aspect of the present invention, it is possible to accurately track a subject included in a first image, in a second image captured after the first image.

DETAILED DESCRIPTION OF INVENTION

An image processing device according to an aspect of the present invention is an image processing device for tracking a subject included in a first image, in a second image captured after the first image. The image processing device includes: a segmentation unit that divides the first image into a plurality of segments based on similarity in pixel values; an indication unit that indicates a position of the subject in the first image; a region setting unit that sets, as a target region, a segment group including an indicated segment which is a segment at the indicated position; an extraction unit that extracts a feature amount from the target region; and a tracking unit that tracks the subject by searching the second image for a region similar to the target region using the extracted feature amount.

According to this configuration, a target region is set using a plurality of segments obtained by dividing the first image based on similarity in pixel values. Therefore, even if the subject has a complex geometry, it is possible to set a target region having a shape suitable for the complex geometry. As a result, a feature amount for the subject can be extracted more accurately than when the feature amount is extracted from a target region having a predetermined shape. Therefore, the subject can be accurately tracked.

Moreover, for example, the segmentation unit may divide the first image into a plurality of segments based on similarity in colors.

According to this configuration, the first image can be divided into a plurality of segments based on similarity in colors. Therefore, the first image can be divided into a plurality of segments so as not to include a plurality of subjects different from each other in one segment. As a result, it is possible to reduce the possibility that the boundary of a subject is included in a segment. This allows for the setting of a target region more suitable for the shape of the subject.

Moreover, for example, the segmentation unit may divide the first image into a plurality of segments by clustering based on similarity defined using colors and positions of pixels.

According to this configuration, the first image can be divided into a plurality of segments by clustering based on similarity defined using colors and the positions of pixels. Therefore, it is possible to divide the first image into a plurality of segments with high accuracy so as not to include a plurality of subjects different from each other in one segment.

Moreover, for example, the clustering may be k-means clustering.

According to this configuration, the first image can be divided into a plurality of segments by the k-means clustering. Therefore, it is possible to divide the first image into a plurality of segments with higher accuracy so as not to include a plurality of subjects different from each other in one segment. Furthermore, as segmentation can be performed by relatively simple processing, processing load for tracking the subject can be reduced.

Moreover, for example, the region setting unit may set a segment group forming one continuous region, as the target region, the segment group including the indicated segment and a similar segment having a value which indicates image similarity to the indicated segment and is greater than a threshold.

According to this configuration, a segment group including an indicated segment and a similar segment can be set as a target region. Therefore, even when a region corresponding to one subject spreads across a plurality of segments, a target region having a shape suitable for the shape of the subject can be set.

Moreover, for example, the tracking unit may scan the second image by moving a frame of a predetermined shape surrounding the target region to extract, at each position in the scanned second image, a feature amount only from a region corresponding to the target region in regions in the frame, and search for a region similar to the target region by comparing the feature amount extracted at each position and the feature amount extracted from the target region.

According to this configuration, a region similar to the target region can be searched for by scanning using a frame of a predetermined shape surrounding the target region. At this time, in the second image, a feature amount is extracted only from a region corresponding to the target region in regions in the frame. Therefore, a region similar to the target region can be searched for by taking into account similarity in shapes in addition to the similarity in feature amounts. This allows for more accurate tracking of the subject.

Moreover, for example, the extraction unit may extract a feature amount for each segment included in the target region, and the tracking unit may search for a region similar to the target region by searching the second image for a region similar to the segment using the feature amount extracted from the segment, for each segment included in the target region.

According to this configuration, the region similar to the segment can be searched for using the feature amount, for each segment. Therefore, even when the shape of a subject significantly changes, the subject can be tracked.

Moreover, the tracking unit may search the second image for a region similar to the segment using not only the feature amount extracted from the segment, but also a positional relationship between the segment and a segment closest to a centroid of the target region.

According to this configuration, the region similar to the segment can be searched for using a positional relationship between segments. This allows for more accurate tracking of the subject.

Moreover, for example, the image processing device may be configured as an integrated circuit.

Moreover, an image capturing device according to an aspect of the present invention includes the image processing device and an image capturing unit for capturing the first image and the second image.

According to this configuration, the same effects as the image processing device can be achieved.

It should be noted that a general or specific aspect of these may be achieved by a system, a method, an integrated circuit, a computer program, or a computer-readable recording medium such as CD-ROM, or may be achieved by any combinations of systems, methods, integrated circuits, computer programs, and recording media.

The following details the embodiment with reference to drawings. It should be noted that the embodiment described below shows a general or specific example. The numerical values, shapes, materials, structural elements, the arrangement and connection of the structural elements, steps, the processing order of the steps and so on shown in the following exemplary embodiment are mere examples, and therefore do not limit the scope of the appended Claims. Among structural elements in the following embodiment, structural elements not recited in the independent claims representing superordinate concept are arbitrary structural elements.

Embodiment

Figure 1:
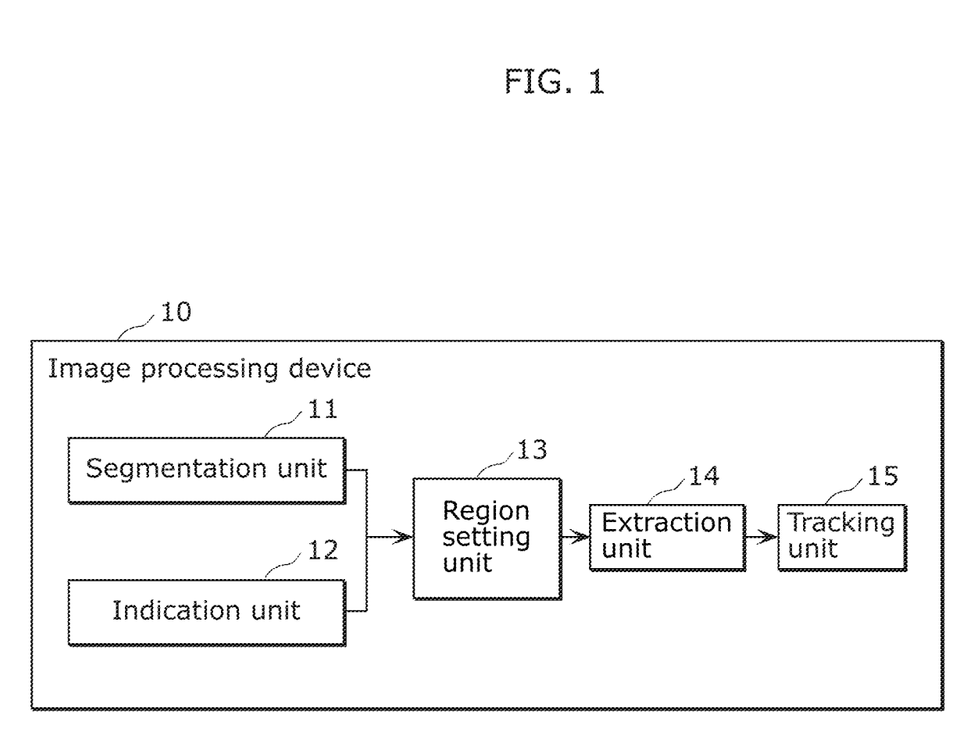
FIG. 1 is a block diagram illustrating a functional configuration of an image processing device according to the embodiment.

FIG. 1 is a block diagram illustrating a functional configuration of an image processing device 10 according to the embodiment. The image processing device 10 tracks a subject included in a first image, in a second image captured after the first image.

As shown in FIG. 1, the image processing device 10 according to the present embodiment includes a segmentation unit 11, an indication unit 12, a region setting unit 13, an extraction unit 14, and a tracking unit 15.

The segmentation unit 11 divides the first image into a plurality of segments based on similarity in pixel values. That is, the segmentation unit 11 divides the first image into a plurality of segments so that pixels having similar pixel values are included in one segment.

Here, the segment corresponds to a part of the first image. Moreover, the processing of dividing an image into a plurality of segments is hereinafter also referred to as segmentation.

Moreover, the pixel value is a value that the pixels of an image have. The pixel value, for example, indicates the luminance, color, lightness, hue, or saturation of a pixel, or the combination of these.

In the present embodiment, the segmentation unit 11 divides the first image into a plurality of segments based on similarity in colors. For example, the segmentation unit 11 divides the first image into a plurality of segments by clustering based on similarity defined using colors and the positions of pixels.

The indication unit 12 indicates the position of a subject in the first image. For example, the indication unit 12 receives input from a user for indicating the position of the subject in the first image via an input device (such as a touch panel). The indication unit 12 then indicates the position of the subject based on the received input. Moreover, the indication unit 12 may indicate a predetermined position in the first image (such as the center position) as the position of the subject, for example. A position indicated by the indication unit 12 is hereinafter referred to as an indicated position.

The region setting unit 13 sets a segment group including an indicated segment as a target region. The indicated segment is a segment at the position indicated by the indication unit 12. Moreover, the segment group is a group including at least one segment. In the present embodiment, the region setting unit 13 sets, as a target region, a segment group (i) forming one continuous region and (ii) including an indicated segment and a similar segment whose value indicating image similarity to the indicated segment is greater than a threshold.

It should be noted that the region setting unit 13 does not necessarily have to set, as the target region, a segment group including an indicated segment and a similar segment. For example, the region setting unit 13 may set a segment group only including the indicated segment as the target region.

The extraction unit 14 extracts a feature amount from a set target region. The feature amount is a value quantitatively indicating the characteristics of the image of the target region. In the present embodiment, the extraction unit 14 extracts the color histogram of the target region as the feature amount. The color histogram represents a frequency corresponding to each of predetermined color components. The color components are predetermined using the range of H (hue) component values in the HSV color space, for example.

It should be noted that the color components are not necessarily determined using the range of the H component values in the HSV color space. For example, the color components may be determined using the range of values obtained from the H component values and at least one of lightness (V) component values and saturation (S) component values. Moreover, the color components may be determined using component values in other color space (such as the RGB color space, the YUV color space, and the Lab color space) instead of using component values in the HSV color space.

The tracking unit 15 tracks a subject by searching the second image for a region similar to the target region using the extracted feature amount. That is, the tracking unit 15 tracks a region in the second image from which a feature amount most similar to a feature amount extracted from the target region is extracted.

In the present embodiment, a color histogram is used as a feature amount. That is, the tracking unit 15 searches the second image for a region from which a color histogram most similar to a color histogram extracted from the target region is extracted. Here, the degree of similarity between the two color histograms is represented by the degree of overlap of the two color histograms. The degree of overlap of the two color histograms indicates the frequency of overlap of the two histograms for each color component.

It should be noted that preferably the two color histograms should be normalized color histograms so as to have the same sum of frequencies. Therefore, the tracking unit 15 can easily calculate a value indicating the degree of similarity between the two color histograms by adding the smaller one of two frequencies for each color component to obtain the frequency sum of all color components.

The following describes the processing operation of the image processing device 10 configured as above.

Figure 2:
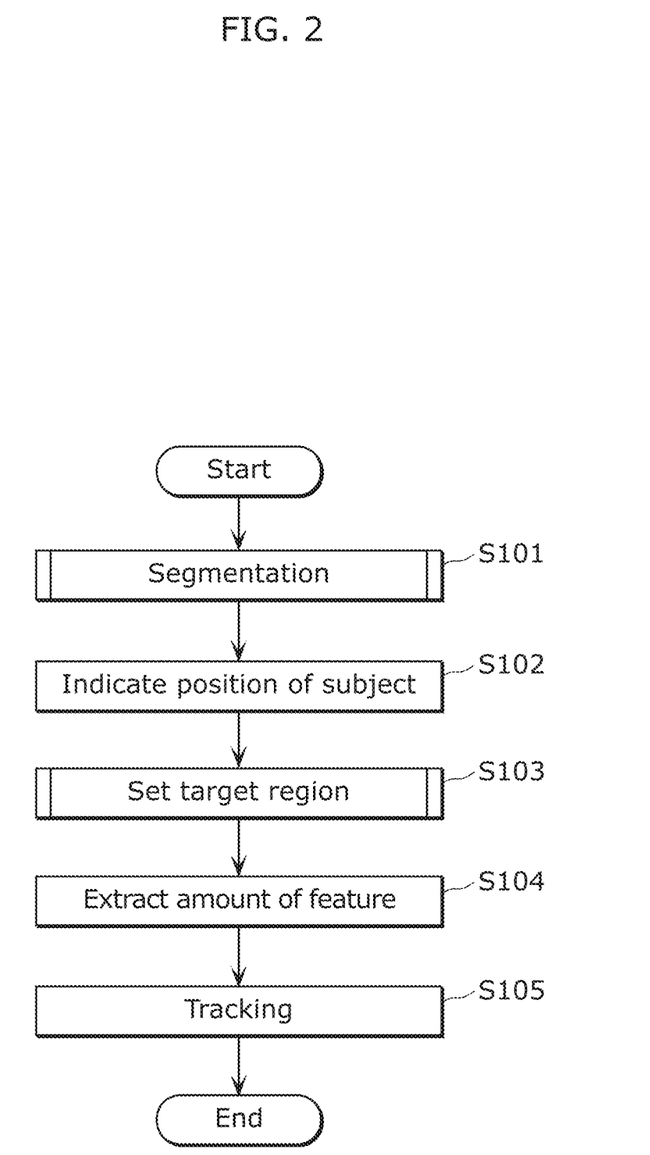
FIG. 2 is a flowchart illustrating the processing operation of an image processing device according to the embodiment.

FIG. 2 is a flowchart illustrating the processing operation of the image processing device 10 according to the embodiment.

The segmentation unit 11 divides the first image into a plurality of segments based on similarity in pixel values (S101). The indication unit 12 indicates the position of a subject in the first image (S102).

The region setting unit 13 sets, as a target region, a region including at least the segment at the indicated position (S103). The extraction unit 14 extracts a feature amount from the target region (S104). The tracking unit 15 tracks a subject by searching the second image for a region similar to the target region using the extracted feature amount (S105).

Thus, the image processing device 10 can track a subject included in a first image, in a second image captured after the first image.

It should be noted that the image processing device 10 does not necessarily have to perform processing in the order of the steps shown in FIG. 2. For example, the image processing device 10 may perform the step S101 after the step S102. Moreover, the image processing device 10 may perform the steps S101 and S102 in parallel, for example.

The following describes the details of the processing operation of the image processing device 10 with reference to drawings. With reference to FIGS. 3 to 6, the segmentation processing (S101) will be described in detail. It should be noted that as an example of the segmentation, the following describes segmentation based on the k-means clustering.

Figure 3:
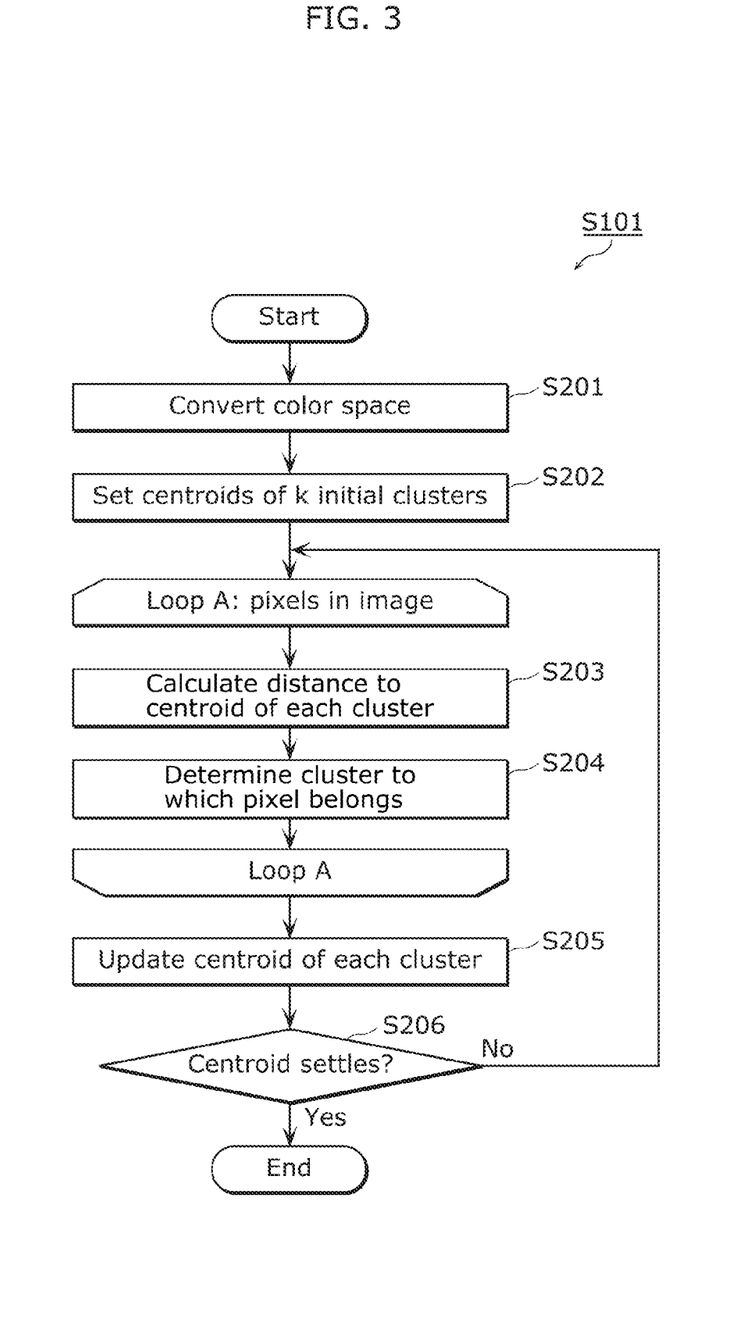
FIG. 3 is a flowchart illustrating the details of the processing operation of a segmentation unit according to the embodiment.
Figure 4:
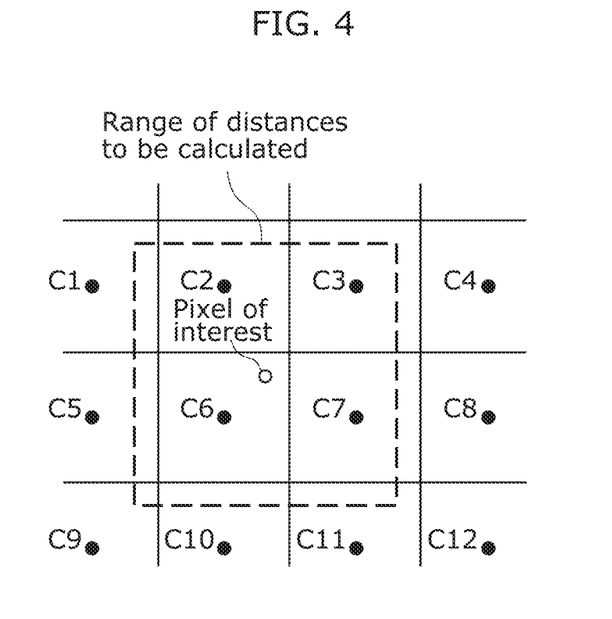
FIG. 4 illustrates an example of the processing operation of a segmentation unit according to the embodiment.
Figure 5:
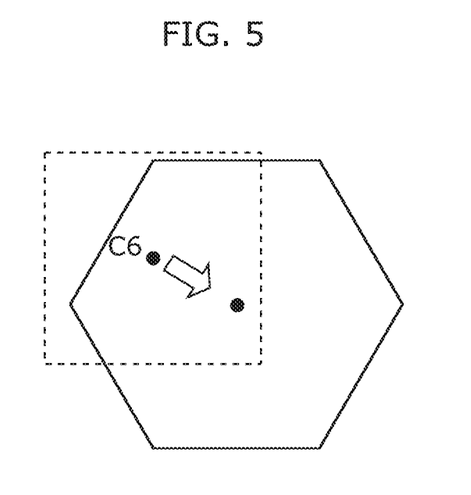
FIG. 5 illustrates an example of the processing operation of a segmentation unit according to the embodiment.
Figure 6:
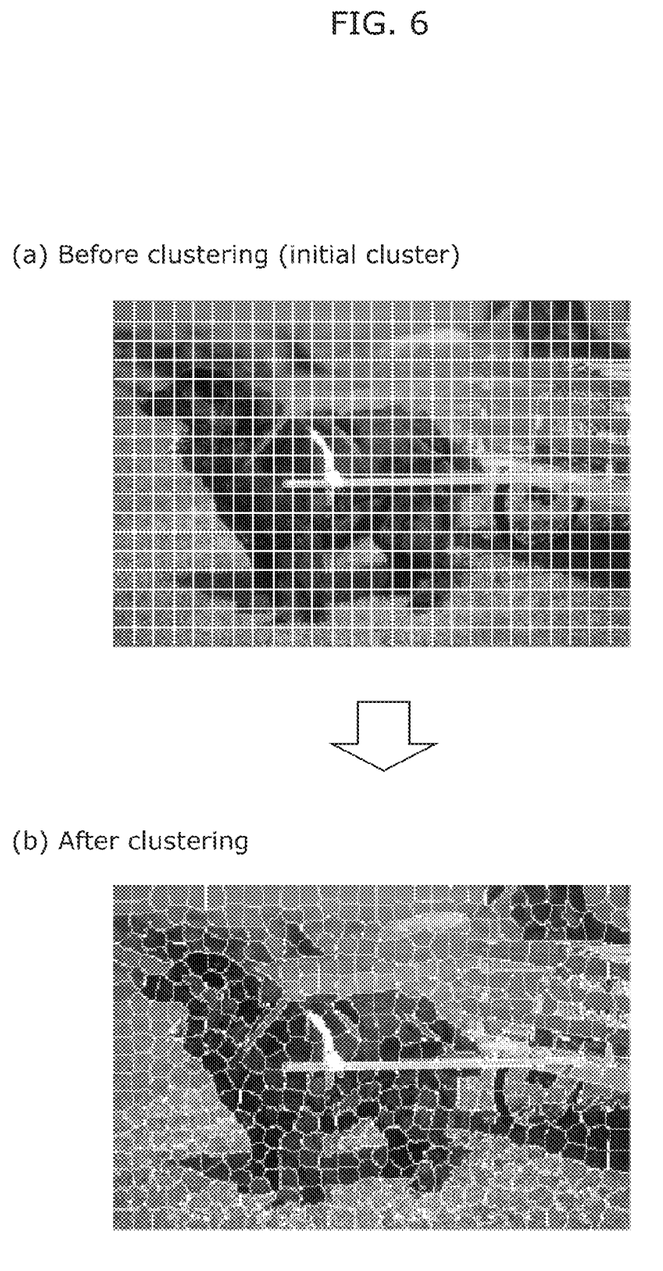
FIG. 6 illustrates an example of a segmentation result according to the embodiment.

FIG. 3 is a flowchart illustrating the details of the processing operation of the segmentation unit 11 according to the embodiment. FIG. 4 illustrates an example of the processing operation of a segmentation unit 11 according to the embodiment. FIG. 5 illustrates an example of the processing operation of a segmentation unit 11 according to the embodiment. FIG. 6 illustrates an example of a segmentation result according to the embodiment.

As shown in FIG. 3, the segmentation unit 11 converts the color space in the first and second images (S201). Specifically, the segmentation unit 11 converts the color space in the first and second images from the RGB color space to the Lab color space.

This Lab color space is perceptually uniform color space. That is, in the Lab color space, when color values equally change, human beings perceive the same visual change. Therefore, the segmentation unit 11 can divide the first image along the boundary of a subject perceived by human beings by segmenting the first image in the Lab color space.

The segmentation unit 11 sets the centroids of k initial clusters (S202). Here, the k is an integer of two or more. The centroids of these k initial clusters are set so as to be evenly arranged in the first image, for example. Here, the centroids of the k initial clusters are set so that a distance between the adjacent centroids is S (the number of pixels).

Subsequently, the processing in Steps S203 and S204 is performed on each pixel in the first image. Specifically, the segmentation unit 11 calculates a distance Ds to the centroid of each cluster (S203). This distance Ds corresponds to a value indicating similarity defined using pixel values and the positions of pixels. Here, smaller the distance Ds is, higher the similarity between the pixel and the centroid of a cluster is.

It should be noted that as shown in FIG. 4, the segmentation unit 11 calculates the distance Ds from a pixel of interest i to only a centroid Ck located within the range of distances to be calculated. Here, in horizontal and vertical directions, positions in which distances from a pixel of interest i to the centroids of initial clusters are less than or equal to S are set as the range of distances to be calculated. That is, the segmentation unit 11 calculates the distances from the pixel of interest i to each of C2, C3, C6, and C7. Thus, the setting of the range of distances to be calculated can reduce calculation load more than when distances to all the centroids are calculated.

The distance Ds from the pixel of interest i (pixel position (xi, yi), pixel value (li, ai, bi)) to the centroid Ck (pixel position (xk, yk), pixel value (lk, ak, bk)) is calculated by the following expression 1.

[Math. 1]

$$D_s = d_{lab} + \frac{m}{S} d_{xy} \quad \text{[Expression 1]}$$
$$d_{lab} = (l_k - l_i)^2 + (a_k - a_i)^2 + (b_k - b_i)^2$$
$$d_{xy} = (x_k - x_i)^2 + (y_k - y_i)^2$$

Here, m is a coefficient for balancing effects which a distance dlab based on a pixel value and a distance dxy based on the location of a pixel have on the distance Ds. The coefficient m may be predetermined experimentally or empirically.

The segmentation unit 11 determines a cluster to which the pixel of interest i belongs, using the distance Ds from the pixel of interest i to each centroid (S204). Specifically, the segmentation unit 11 determines, as the cluster of the pixel of interest i, a cluster having a centroid from which to the pixel of interest i is the shortest distance Ds.

Repetition of the processing in the steps S203 and S204 for each pixel in the first image determines their clusters of the pixels.

The segmentation unit 11 updates the centroid of each cluster (S205). For example, when the rectangular cluster changes to the hexagonal cluster as shown in FIG. 5 as result of determining their clusters of the pixels in the step S204, the pixel value and the position of a pixel at the centroid C6 are updated.

Specifically, the segmentation unit 11 calculates the pixel value (lk_new, ak_new, bk_new) and the position of the pixel (xk_new, yk_new) at a new centroid in accordance with the following expression 2.

[Math. 2]

$$l_{k\_new} = \frac{1}{N} \sum_{i=0, i \in k}^{N} l_i; \quad \text{[Expression 2]}$$
$$a_{k\_new} = \frac{1}{N} \sum_{i=0, i \in k}^{N} a_i;$$
$$b_{k\_new} = \frac{1}{N} \sum_{i=0, i \in k}^{N} b_i;$$
$$x_{k\_new} = \frac{1}{N} \sum_{i=0, i \in k}^{N} x_i;$$
$$y_{k\_new} = \frac{1}{N} \sum_{i=0, i \in k}^{N} y_i$$

Here, when the centroid of each cluster settles (Yes in S206), the segmentation unit 11 ends the processing. That is, when there is no change in the centroid of each cluster before and after the update of the step S205, the segmentation unit 11 ends the processing. Meanwhile, when the centroid of each cluster does not settle (No in S206), the segmentation unit 11 repeats the processing in Steps S203 to S205.

Thus, the segmentation unit 11 can divide the first image into a plurality of segments by clustering (here, k-means clustering) based on similarity defined using pixel values and the position of pixels. Therefore, as shown in FIG. 6, the segmentation unit 11 can divide the first image into a plurality of segments according to the characteristics of a subject region included in the first image.

That is, the segmentation unit 11 can divide the first image into a plurality of segments so that the same subject is included in one segment. As a result, the disparity values of pixels in each segment are similar. Therefore, the accuracy of a disparity value identified for each segment can be improved. That is, depth data can be more accurately created. Furthermore, as the K-means clustering is relatively simple clustering, processing load for creating the depth data can be reduced.

Figure 7:
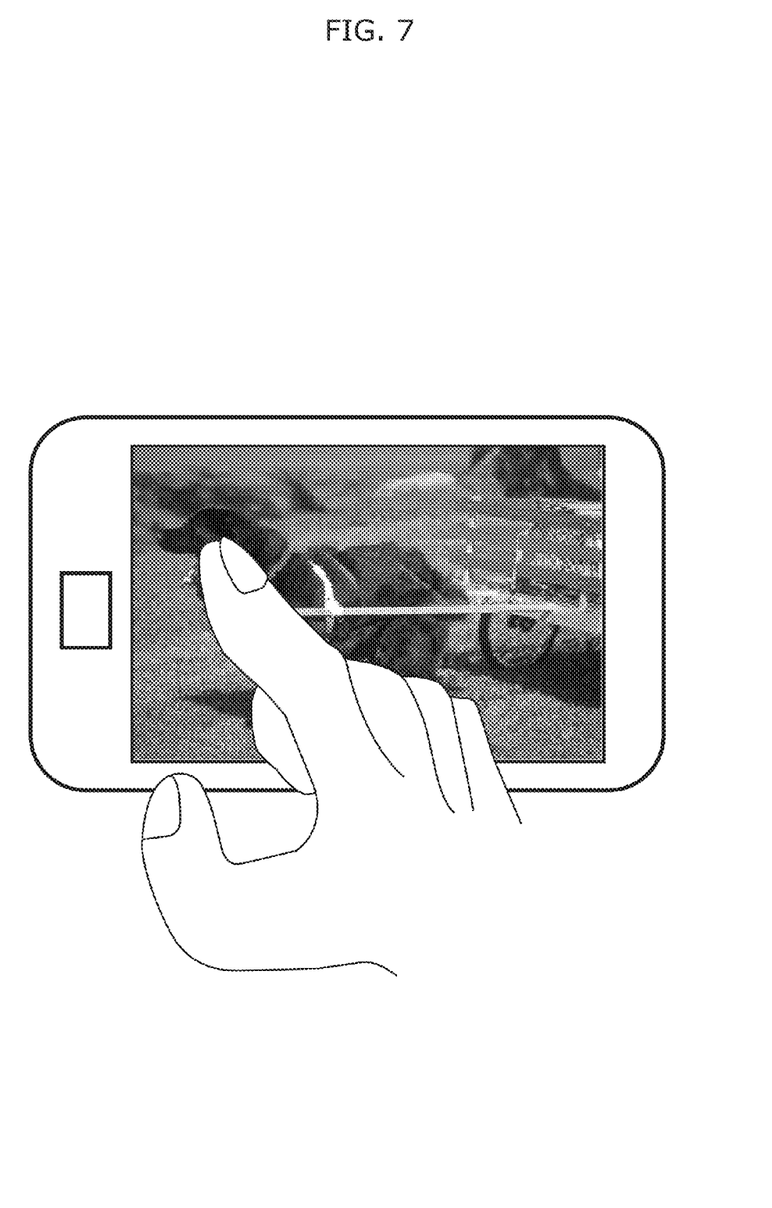
FIG. 7 illustrates an example of the processing operation of an indication unit according to the embodiment.

With reference to FIG. 7, the following describes the details of the indication processing (S102).

FIG. 7 illustrates an example of the processing operation of the indication unit 12 according to the embodiment. As shown in FIG. 7, the indication unit 12 indicates, as the position of a subject, a position on a touch panel which a user touched. The touch panel such as a resistive type or capacitive type touch panel detects the position touched by the user.

Thus, the indication unit 12 indicates the position on the touch panel which the user touched as the position of the subject. Therefore, the user can easily indicate the position of the subject only by touching the touch panel.

It should be noted that the touched position is not only the position touched by the user but also may be a position representing a region bounded by a path drawn by positions touched by the user.

Moreover, the indication unit 12 does not necessarily have to obtain a position inputted by the user via the touch panel. For example, the indication unit 12 may indicate, as the position of the subject, a position on a display which the user inputted via an operation button or the like.

Figure 8:
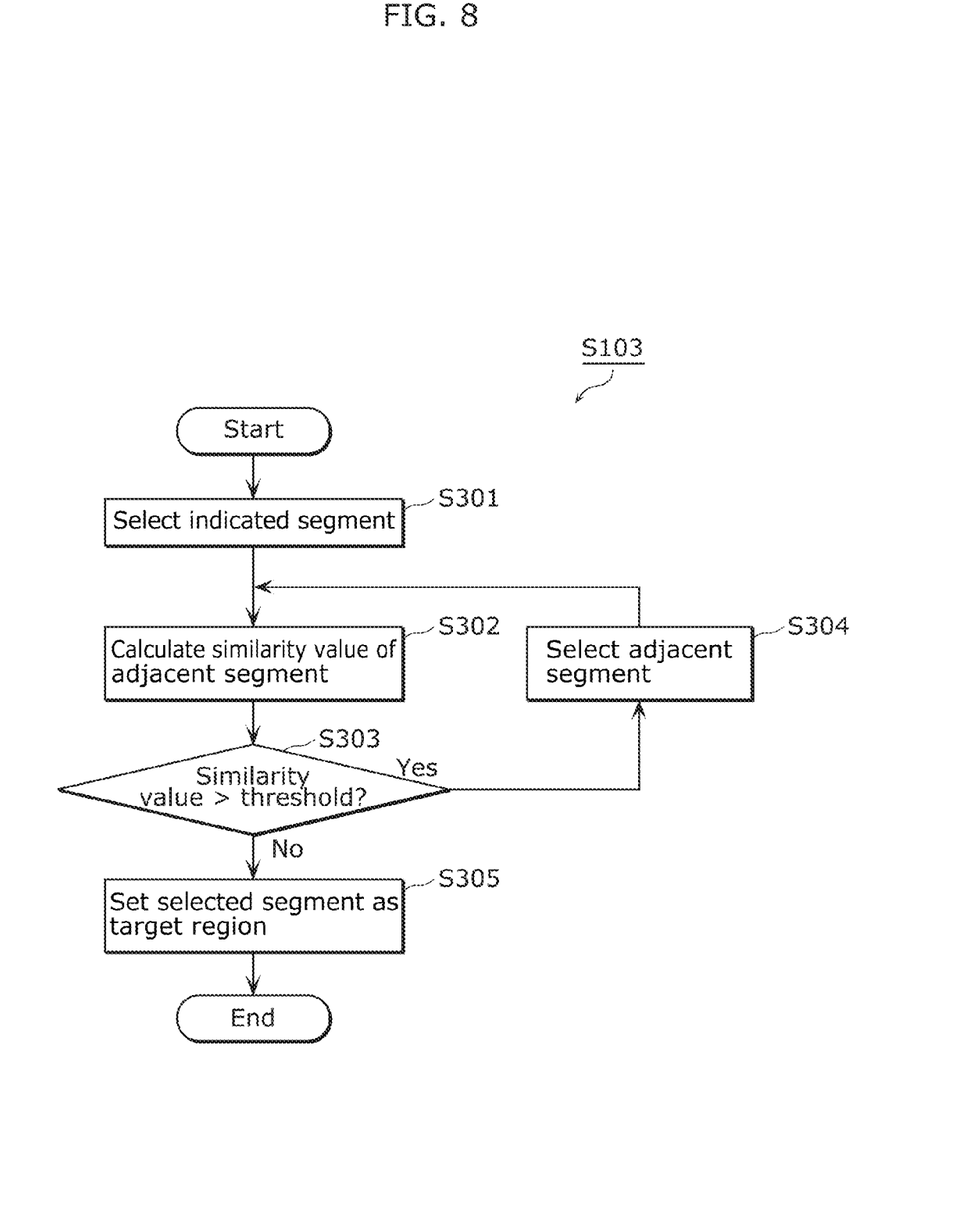
FIG. 8 is a flowchart illustrating the details of the processing operation of a region setting unit according to the embodiment.
Figure 9:
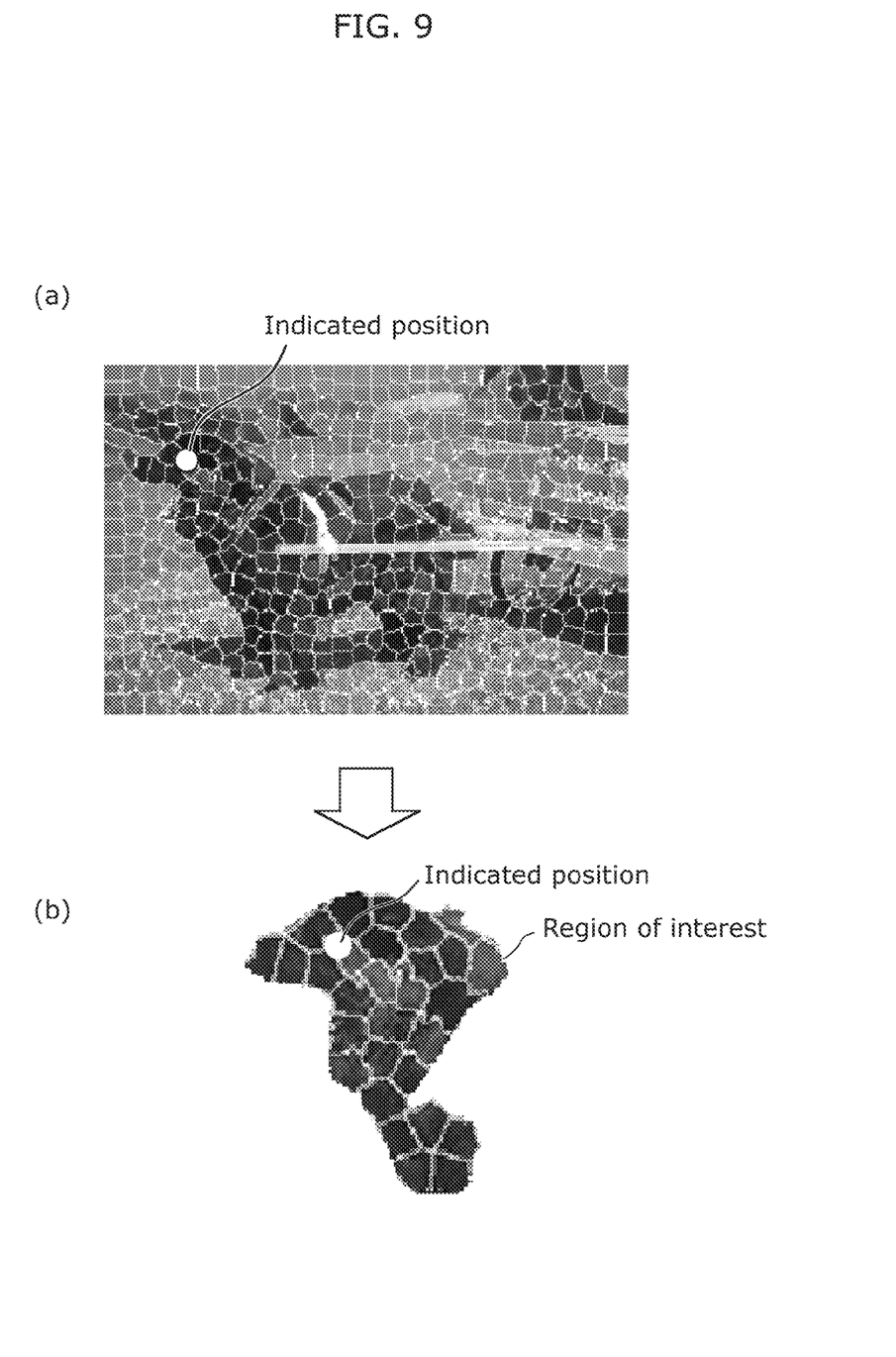
FIG. 9 illustrates an example of the processing operation of a region setting unit according to the embodiment.

With reference to FIGS. 8 and 9, the following describes the details of the setting processing (S103) of a target region.

FIG. 8 is a flowchart illustrating the details of the processing operation of the region setting unit 13 according to the embodiment. FIG. 9 illustrates an example of the processing operation of the region setting unit 13 according to the embodiment.

As shown in FIG. 8, the region setting unit 13 selects an indicated segment (S301). The region setting unit 13 calculates a value indicating image similarity (hereinafter referred to as "similarity value") between an indication segment and a segment adjacent to a segment selected in the step S301 or the step S304 (hereinafter referred as "selected segment") (hereinafter referred as "adjacent segment") (S302). Specifically, the region setting unit 13 calculates, as a similarity value, a value indicating the degree of overlap of the color histograms of the indicated segment and the adjacent segment, for example.

When the similarity value is greater than a threshold (Yes in S303), the region setting unit 13 selects the adjacent segment as a similar segment (S304), and goes back to the processing in the step S302 again. On the other hand, when the similarity value is less than the threshold (No in S303), the region setting unit 13 sets a region including a selected segment as a target region (S305). That is, the region setting unit 13 sets the segments selected in the steps S301 and S304 as a target region.

By performing the above processing, the region setting unit 13 can set, as a target region, a segment group including the indicated segment and a similar segment whose value indicating image similarity to the indicated segment is greater than a threshold. For example, when the position of a subject is indicated as shown in (a) in FIG. 9, the region setting unit 13 can set a region including an indicated segment and similar segments as a target region as shown in (b) in FIG. 9.

It should be noted that when there are more than one adjacent segment, the region setting unit 13 may perform the processing in the steps S302 to S304 for each adjacent segment.

Moreover, the similarity value is not necessarily a value indicating the degree of overlap of color histograms. For example, the similarity value may be a value indicating a difference between the average colors of two segments. Moreover, the similarity value may be a value indicating similarity in luminance, lightness, or saturation rather than color.

Moreover, the similarity value may be a value indicating similarity in positions in addition to similarity in images. In this case, a segment which is more distant from the indicated segment has a lower similarity value.

Figure 10:
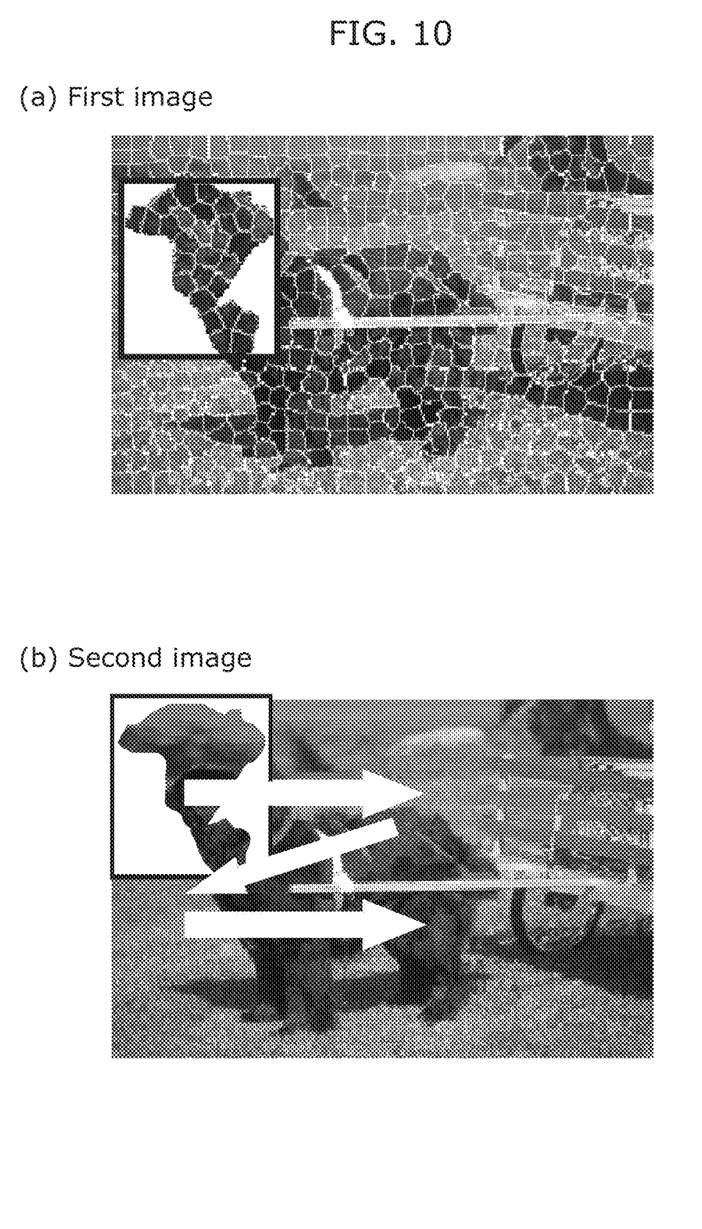
FIG. 10 illustrates an example of the processing operation of a tracking unit according to the embodiment.

With reference to FIG. 10, the following describes the details of the tracking processing (S105). FIG. 10 illustrates an example of the processing operation of the tracking unit 15 according to the embodiment.

Here, in the second image, the tracking unit 15 scans the second image by moving a frame of a predetermined shape surrounding a target region. For example, as shown in (a) and (b) in FIG. 10, the tracking unit 15 scans the second image by moving a rectangular frame in contact with the outer edges of a target region in the second image.

At this time, the tracking unit 15 extracts a feature amount only from a region corresponding to the target region in regions in the frame, at each position of the scanned second image. For example, as shown in (b) in FIG. 10, the tracking unit 15 extracts a feature amount only from the region other than a blank region in the regions in the frame.

The tracking unit 15 compares the feature amount extracted at each position in the second image in this way and the feature amount extracted from the target region in order to search the second image for a region similar to the target region.

Thus, with an image processing device according to the present embodiment, a target region is set using a plurality of segments obtained by dividing the first image based on similarity in pixel values. Therefore, even if a subject has a complex geometry, a target region having a shape suitable for such a complex geometry can be set. As a result, a feature amount for the subject can be extracted more appropriately than when the feature amount is extracted from a target region having a predetermined shape. Thus, it is possible to accurately track the subject.

Moreover, with an image processing device according to the present embodiment, a first image can be divided into a plurality of segments based on similarity in colors. Therefore, it is possible to divide the first image into a plurality of segments so as not to include a plurality of subjects different from each other in one segment. As a result, it is possible to reduce the possibility that the boundary of a subject is included in a segment. This allows the setting of a target region having a shape more suitable for the shape of the subject.

Moreover, with the image processing device according to the present embodiment, the first image can be divided into a plurality of segments by clustering based on similarity defined using colors and the positions of pixels. Therefore, it is possible to divide the first image into a plurality of segments with high accuracy so as not to include a plurality of subjects different from each other in one segment.

Moreover, with an image processing device according to the present embodiment, the first image can be divided into a plurality of segments by the k-means clustering. Therefore, it is possible to divide the first image into a plurality of segments with higher accuracy so as not to include a plurality of subjects different from each other in one segment. Furthermore, as segmentation can be performed by relatively simple processing, processing load for tracking the subject can be reduced.

Moreover, with an image processing device according to the present embodiment, it is possible to set a segment group including an indicated segment and a similar segment as a target region. Therefore, even when the region of one subject spreads across a plurality of segments, a target region having a shape suitable for the shape of the subject can be set.

Moreover, with an image processing device according to the present embodiment, a region similar to the target region can be searched for by scanning using a frame of a predetermined shape surrounding the target region. It should be noted that in the second image, a feature amount is extracted only from a region corresponding to the target region in regions in the frame. Therefore, a region similar to the target region can be searched for by taking into account similarity in shapes in addition to the similarity in feature amounts. This allows for more accurate tracking of the subject.

[Modification]

Figure 11:
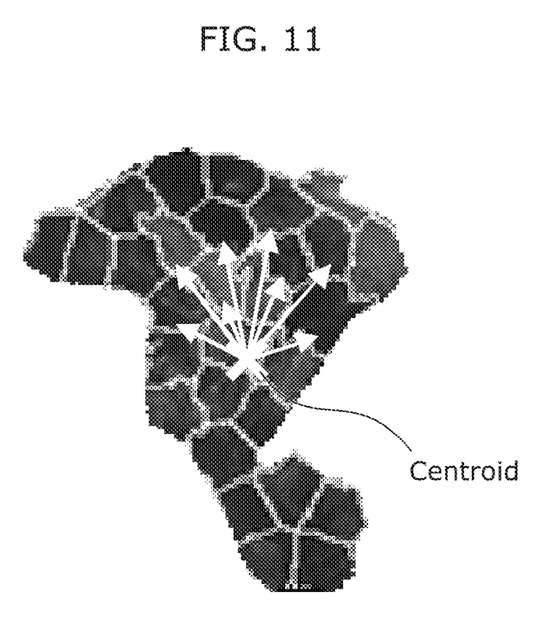
FIG. 11 illustrates an example of the processing operation of a tracking unit according to the modification of the embodiment.
Figure 12:
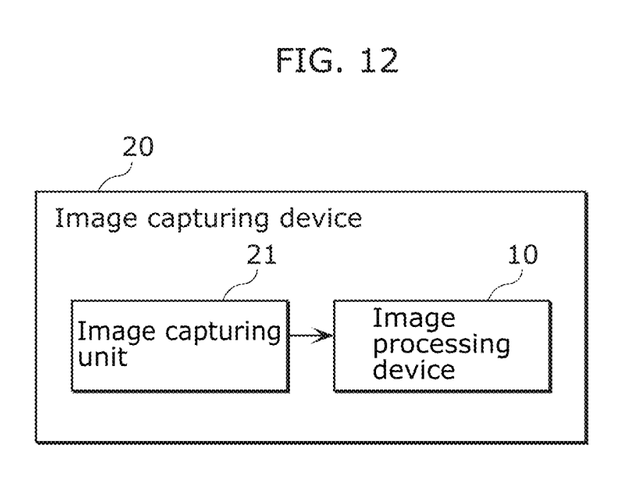
FIG. 12 is a block diagram illustrating a configuration of an image capturing device according to an embodiment.

The following describes a modification of the embodiment. The present modification is different from the embodiment in the processing operations of the extraction unit 14 and the tracking unit 15. FIG. 11 illustrates an example of the processing operation of the tracking unit 15 according to the modification of the embodiment.

The extraction unit 14 according to the present modification extracts a feature amount for each segment included in a target region.

The tracking unit 15 according to the present modification searches for a region similar to the target region by searching a second image for a region similar to the segment using the feature amount extracted from the segment for each segment included in the target region.

Here, the tracking unit 15 searches the second image for a region similar to the segment using not only the feature amount extracted from the segment but also the positional relationship between the segment and the centroid of the target region. Specifically, the tracking unit 15 searches the second image for a region similar to the segment based both on (i) similarity in the positions of the segment and the centroid of the target region and (ii) similarity in feature amounts.

For example, as shown in FIG. 11, the tracking unit 15 searches the second image for a region similar to the segment using vectors connecting the centroid and segments. Specifically, when searching the second image for a region similar to each segment in the target region, the tracking unit 15 calculates a value indicating similarity between (i) a vector connecting the centroid of the target region and a representative point in the segment and (ii) a vector connecting a position corresponding to the centroid of the target region in the second image and a representative point in a region to be searched for. Furthermore, the tracking unit 15 calculates a value indicating similarity between (i) a feature amount extracted from the segment and (ii) a feature amount extracted from the region to be searched for. The tracking unit 15 determines whether or not the region to be searched for is similar to the segment using two similarity values calculated in such a manner.

Thus, with an image processing device according to the present modification, it is possible to search for a region similar to the segment for each segment using the feature amounts. Therefore, even when the shape of a subject significantly changes, the subject can be tracked.

Moreover, with an image processing device according to the present modification, a region similar to a segment can be searched for using positional relationships between segments. This allows for more accurate tracking of the subject.

Although the image processing devices according to one or more aspects are described above based on the embodiment, the present invention is not limited to the present embodiment. Results obtained by making various modifications which those skilled in the art would conceive to the present embodiment also fall within the one or more aspects unless these modifications depart from the scope of the present invention.

For example, in the embodiment, the segmentation unit 11 performs segmentation based on the k-means clustering. However, the segmentation unit 11 may perform segmentation based on other clustering methods. For example, the segmentation unit 11 may perform the segmentation based on mean-shift clustering.

Moreover, in the embodiment, the tracking unit 15 searches all the regions in the second image for a region similar to a target region. However, the search does not necessarily cover all the regions. For example, the tracking unit 15 may search for a region similar to the target region in the neighborhood region of a position corresponding to the target region in the second image. This can reduce a region to be searched for, and thus reduce processing load.

Moreover, a part or all of the structural elements included in the image processing device 10 in the embodiment may be single System-LSI (Large-Scale Integration). For example, the image processing device 10 may be a system LSI including the segmentation unit 11, the indication unit 12, the region setting unit 13, the extraction unit 14, and the tracking unit 15.

The System-LSI is a super-multi-function LSI manufactured by integrating constituent units on one chip, and is specifically a computer system including a microprocessor, a read only memory (ROM), a random access memory (RAM), and so on. A computer program is stored in the ROM. The System-LSI achieves its function through microprocessor's operation in accordance with the computer program.

It should be noted that, although the System-LSI is described here, the system may be called IC, LSI, super LSI, or ultra LSI according to the degree of integration. Moreover, the means for circuit integration is not limited to an LSI, but it may be implemented with a dedicated circuit or a general-purpose processor. A field programmable gate array (FPGA) that is programmable after the manufacture of the LSI, or a reconfigurable processor which can reconfigure connections and settings of circuit cells within the LSI may be used.

Furthermore, if progress in the semiconductor technology or another derived technology brings an integrated circuit technology that will replace LSI, then of course, functional blocks may be integrated using that technology. Application of the biotechnology is a possible example.

Moreover, such an image processing device may be included in an image capturing device. FIG. 10 is a block diagram illustrating a functional configuration of an image capturing device 30 according to the embodiment. The image capturing device 30 is a digital still camera or digital video camera, for example. As shown in FIG. 10, the image capturing device 30 includes an image capturing unit 31 for capturing first and second images at different views and the image processing device 10 according to the embodiment.

It should be noted that in the above embodiment, each structural element may be a dedicated hardware or may be achieved by executing a software program suitable for the each element. A program execution unit such as a CPU or a processor may read and execute a software program recorded in a recording medium such as a hard disk or a semiconductor memory to achieve the each element. Here, software which achieves an image decoding device in the above embodiment is described below.

That is, this program causes a computer to execute an image processing method for tracking a subject included in a first image, in a second image captured after the first image. The image processing method includes: dividing the first image into a plurality of segments based on similarity in pixel values; indicating a position of the subject in the first image; setting, as a target region, a segment group including an indicated segment which is a segment at the indicated position; extracting a feature amount from the target region, and tracking the subject by searching the second image for a region similar to the target region using the extracted feature amount.

The present invention is applicable to an image processing device which can accurately track a subject included in a first image, in a second image captured after the first image, and to an image capturing device including such an image processing device, such as a digital still camera or a digital video camera.

REFERENCE SIGNS LIST 10 image processing device
11 segmentation unit
12 indication unit
13 region setting unit
14 extraction unit
15 tracking unit
30 image capturing device
31 image capturing unit

The invention claimed is:

1. An image processing device for tracking a subject included in a first image, in a second image captured after the first image, the image processing device comprising:
a non-transitory memory storing a program; and
a hardware processor that executes the program and causes the image processing device to operate as:
a segmentation unit configured to divide the first image into a plurality of segments based on similarity in pixel values;
an indication unit configured to indicate a position of the subject in the first image;
a region setting unit configured to set, as a target region, a segment group including an indicated segment which is a segment at the indicated position;
an extraction unit configured to extract a feature amount from the target region; and
a tracking unit configured to track the subject by searching the second image for a region similar to the target region using the extracted feature amount, and
wherein the region setting unit is configured to (i) calculate a value indicating image similarity to the indicated segment, for each of one or more segments which are among the plurality of segments and different from the indicated segment, (ii) determine, when the value calculated for the segment is greater than a threshold, the segment as a similar segment, and (iii) set a segment group forming one continuous region, as the target region, the segment group including the indicated segment and the similar segment, the extraction unit is configured to extract a feature amount for each segment included in the target region, the tracking unit is configured to search for a region similar to the target region by searching the second image for a region similar to the segment using the feature amount extracted from the segment, for each segment included in the target region, the tracking unit is configured to search the second image for a region similar to the segment using not only the feature amount extracted from the segment, but also a positional relationship between the segment and a segment having a distance closest to a centroid of the target region, and the distance corresponding to a value indicating a similarity between pixel values and positions of pixels of the segments, wherein the closer the distance to the centroid the higher the similarity between the pixel values and positions of pixels of the segments.

2. The image processing device according to claim 1, wherein the segmentation unit is configured to divide the first image into a plurality of segments based on similarity in colors.

3. The image processing device according to claim 2, wherein the segmentation unit is configured to divide the first image into a plurality of segments by clustering based on similarity defined using colors and positions of pixels.

4. The image processing device according to claim 3, wherein the clustering is k-means clustering.

5. The image processing device according to claim 1, wherein the image processing device is configured as an integrated circuit.

6. An image capturing device comprising:
the image processing device according to claim 1; and
an image capturing unit configured to capture the first image and the second image.

7. An image processing method for tracking a subject included in a first image, in a second image captured after the first image, the image processing method comprising:

dividing the first image into a plurality of segments based on similarity in pixel values; indicating a position of the subject in the first image;

setting, as a target region, a segment group including an indicated segment which is a segment at the indicated position;

extracting a feature amount from the target region, and tracking the subject by searching the second image for a region similar to the target region using the extracted feature amount, and wherein in the setting of the segment group, the setting includes (i) calculating a value indicating image similarity to the indicated segment, for each of one or more segments which are among the plurality of segments and different from the indicated segment, (ii) determining, when the value calculated for the segment is greater than a threshold, the segment as a similar segment, and (iii) setting a segment group forming one continuous region as the target region, the segment group including the indicated segment and the similar segments, extracting a feature amount for each segment included in the target region, searching for a region similar to the target region by searching the second image for a region similar to the segment using the feature amount extracted from the segment, for each segment included in the target region, searching the second image for a region similar to the segment using not only the feature amount extracted from the segment, but also a positional relationship between the segment and a segment having a distance closest to a centroid of the target region, and the distance corresponding to a value indicating a similarity between pixel values and positions of pixels of the segments, wherein the closer the distance to the centroid the higher the similarity between the pixel values and positions of pixels of the segments.

8. A non-transitory computer-readable recording medium storing a program for causing a computer to execute the image processing method according to claim 7.

* * * * *